Figure 1:
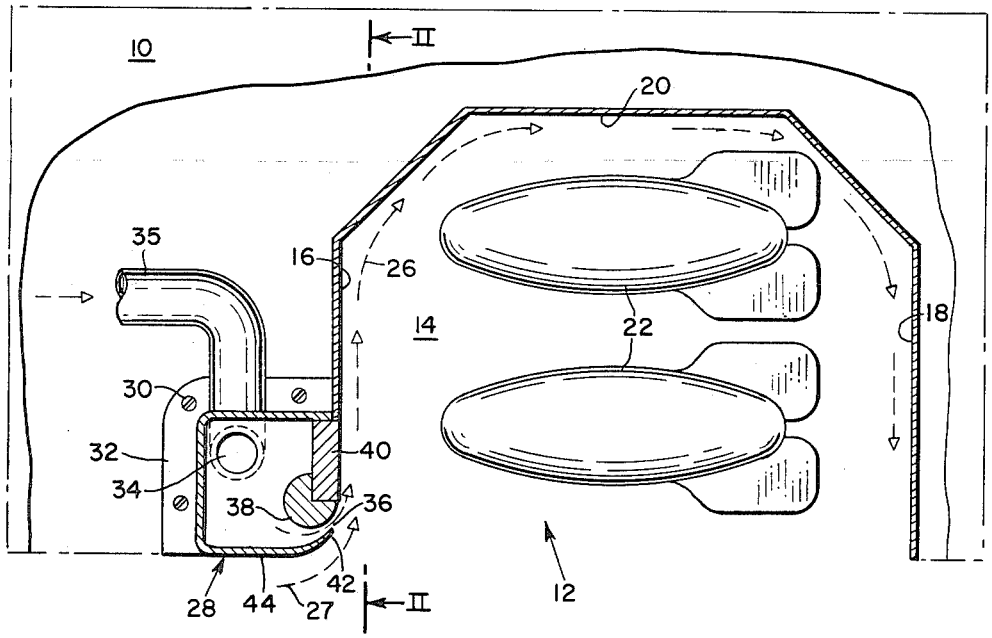

Oct. 4, 1960   A. M. O. SMITH ET AL   2,954,949
BOMB BAY BUFFET CONTROL
Filed Oct. 28, 1958

INVENTORS
APOLLO M. O. SMITH
JOSEPH G. BRAZIER
BY
*F. I. Schmitt*
*George X. Rubens*
ATTORNEYS

United States Patent Office 2,954,949
Patented Oct. 4, 1960

2,954,949

BOMB BAY BUFFET CONTROL

Apollo M. O. Smith, San Marino, and Joseph G. Brazier, Los Angeles, Calif., assignors, by mesne assignments, to the United States of America as represented by the Secretary of the Navy Filed Oct. 28, 1958, Ser. No. 770,243

4 Claims. (Cl. 244—137)

This invention relates to air flow stabilizing controls and more particularly to such a control for stabilizing the ram air flow within and around the vicinity of an aircraft compartment open to atmosphere, such as a bomb bay.

The adverse effects of turbulent air currents around and in the bomb-supporting structure of aircraft has been a problem almost since the advent of bombing aircraft. The use of bomb bays in modern aircraft has compounded the problem. Turbulent flow around the bomb stores causes the released bombs to tumble and take erratic courses hindering bombing accuracy. Furthermore, in high subsonic aircraft opening of the bomb bay gives rise to high amplitude vibrations which reduce effective surface control, and can become sufficiently severe to cause structural failure.

As can be expected, numerous attempts have been made to stabilize the air flow in and around the bomb stores, and for the most part these solutions have employed the rather obvious use of deflector plates of all sizes and shapes. Some of the deflectors are perforated and in operative position extend out beyond the fuselage into the flow around the bomb bay to smooth out the ram air flow and induce a desired flow through the bomb bay.

It has been found that devices of this type are generally unsatisfactory in high performance bombing aircraft because of the inherent aerodynamic drag caused by the protruding surface. Furthermore, deflectors do not actually produce an adequate stabilizing effect on the turbulent air currents.

According to the present invention, these disadvantages have been overcome by creating a positive air current in the bomb bay independent of the ram air. This induced air current preferably has an upward flow in the forward portion and a downward flow in the aft portion of the bomb bay and reduces a buffeting effect. The air current is created by positioning a pressurized manifold duct adjacent the leading edge of the bomb bay cavity, said duct having an inlet from a pressure source. The duct is provided with an outlet leading to and extending across the bomb bay. The outlet is constructed to discharge the pressurized gas in a suitable direction within the bomb bay to create the desired flow. One convenient source for the pressurized gas can be an air bleed from a bombing aircraft having a turbojet power plant.

A principal object of this invention is to produce a more stable air flow in and around a cavity in an aircraft.

A further object is to provide a device for stabilizing the air flow in and around a bomb bay that will minimize aerodynamic drag on the aircraft.

Still another object is to provide such a device that relies on a pressurized gas, requires no moving parts, is light in weight, and can utilize an exiting pressure source in the aircraft.

Figure 2:
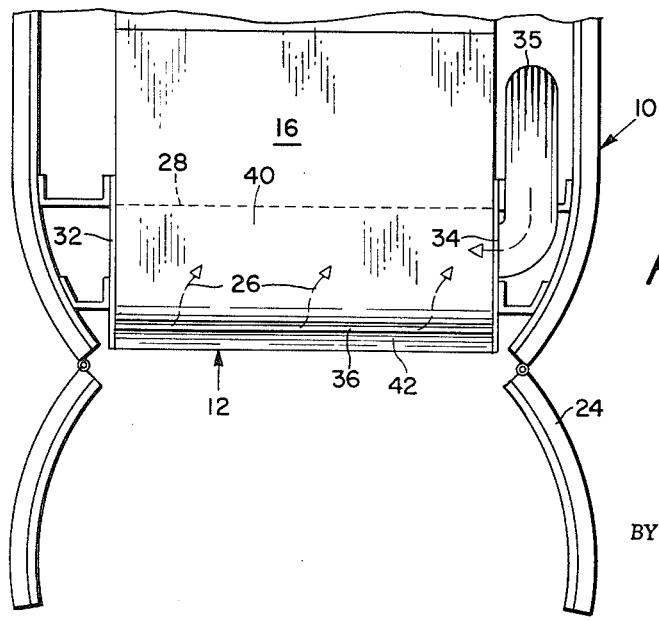

Other objects and many of the attendant advantages of this invention will be readily appreciated as the same becomes better understood by reference to the following detailed description when considered in connection with the accompanying drawings wherein:

Fig. 1 is a partial longitudinal section through the bomb bay of an aircraft employing the novel air stabilizing control with the bomb bay doors omitted; and Fig. 2 is a transverse section through the bomb bay of Fig. 1 taken along line II—II.

Referring now to the drawing where like reference numerals refer to similar parts throughout the figures, there is shown in Fig. 1 a fuselage 10 of a bombing aircraft having a direction of flight indicated by arrow 11. The fuselage contains a recessed bomb bay 12 having side walls 14, forward and aft walls 16 and 18 respectively, and a top wall 20. A plurality of bombs 22 or the like are suspended in the bomb bay in a conventional manner, not shown. Suitable bomb bay doors 24 are provided hinged to the fuselage and actuated in any manner well known in the art.

The foregoing described fuselage is conventional structure, the novelty of the present invention residing in the manner of creating a desirable stabilizing air flow, indicated by arrows 26, in the bomb bay independent of ram air 27 flowing adjacent the bomb bay. Stabilizing flow 26 is created by a manifold duct 28 mounted in the lower corner of forward wall 16 and extending transversely the fuselage and preferably substantially the breadth of the bomb bay. The duct is suitably secured to side walls 14 by screws 30 extending through duct flanges 32.

Duct 28 is provided with an inlet opening 34 in one or more sides by which pressurized gas, preferably compressed air, is admitted through pipe 35. One suitable source of pressurized air is an air bleed from a turbojet power plant of the aircraft or any other available or specially installed source. The compressed air in the duct is discharged through an outlet 36 positioned at the lower edge of the forward wall being the leading edge of the bomb bay. Outlet 36 is a narrow slot which may be formed between a rounded lip 38 welded or otherwise formed on a side duct wall 40 and an upwardly turned tapered lip 42 on bottom duct wall 44 whereby the air is ejected tangentially of the rounded edge in an upward direction. Outlet 36 preferably extends continuously for the length of the duct to provide a sheet-like stream of air substantially over the entire width of the bomb bay.

The ejected air flow 26 is directed in generally arcuate path conforming to the inner-walled configuration of the bomb bay, and is exhausted at the trailing edge of the bomb bay. Front and aft walls 16 and 18 respectively, have upper converging slanted wall portions to ensure a smooth air flow. Ram air flow 27 adjacent the fuselage will be induced into the bomb bay by air flow 26 and be carried along in the same general path. Thus, air flow 26 from manifold 28 will stabilize both the air flow in the bomb bay and the air stream flowing along the fuselage adjacent the bomb bay.

In addition to reduced buffeting, the invention device being completely housed within the bomb bay does not create a drag as the prior art deflectors. The invention device also avoids the use of moving parts and the driving mechanism therefor. Use of a manifold and a slot-like outlet enables the pressurized gas to be uniformly discharged through the outlet to ensure a stabilized air flow in the bomb bay.

Obviously many modifications and variations of the present invention are possible in the light of the above teachings. It is therefore to be understood that within the scope of the appended claims the invention may be practiced otherwise than as specifically described.

We claim:
1. In an aircraft having a fuselage provided with a bomb bay adapted to be open to atmosphere, said bomb bay having top, forward and rearward walls, air flow stabilizing means mounted completely within said fuselage and operable therein when said bomb bay is open said means comprising a source of pressurized air, a manifold having an inlet connected to said source and an outlet leading into said bomb bay, said outlet being only in said forward wall and directed upwardly whereby a positive air flow is established in said bomb bay from said front wall to the rearward wall producing a stable environment among bombs adapted to be supported therein during aircraft flight.

2. In the aircraft of claim 1 wherein forward and rearward walls have upper converging portions.

3. In the aircraft of claim 1 wherein said manifold extends substantially the breadth of the bomb bay and said outlet comprises a continuous narrow slot extending substantially the manifold length.

4. The aircraft of claim 3 wherein one edge of said slot is curved inwardly of the bomb bay and upwardly for directing the air flow tangentially upwardly in the bomb bay, and another edge of the slot is a rounded lip.

References Cited in the file of this patent

UNITED STATES PATENTS

| | | |
|---|---|---|
| 2,218,938 | Rinne | Oct. 22, 1940 |
| 2,663,276 | Ouellet | Dec. 22, 1953 |
| 2,749,064 | Kuhlman | June 5, 1956 |
| 2,844,337 | MacArthur et al. | July 22, 1958 |